US011105991B2

(12) United States Patent
Hikosaka (10) Patent No.: US 11,105,991 B2
(45) Date of Patent: Aug. 31, 2021

(54) CONNECTOR

(71) Applicant: YAZAKI CORPORATION, Tokyo (JP)

(72) Inventor: Tomohiro Hikosaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/888,630

(22) Filed: May 29, 2020

(65) Prior Publication Data

US 2020/0379196 A1    Dec. 3, 2020

(30) Foreign Application Priority Data

May 30, 2019    (JP) .............................. JP2019-101437

(51) Int. Cl.
*G02B 6/42*    (2006.01)
(52) U.S. Cl.
CPC ........... *G02B 6/4277* (2013.01); *G02B 6/428* (2013.01)

(58) Field of Classification Search
None
See application file for complete search history.

(56) References Cited

U.S. PATENT DOCUMENTS

| 2012/0264330 A1 | 10/2012 | Banakis et al. |
| 2015/0277063 A1 | 10/2015 | Hikosaka |
| 2016/0104971 A1 | 4/2016 | Kurachi |
| 2017/0214187 A1 | 7/2017 | Hwangbo |

FOREIGN PATENT DOCUMENTS

| DE | 10 2010 010 359 A1 | 9/2010 |
| EP | 2 040 104 A1 | 3/2009 |
| JP | 2009-69710 A | 4/2009 |
| JP | 2010-210655 A | 9/2010 |
| JP | 2013-508937 A | 3/2013 |
| JP | 2014-119691 A | 6/2014 |

*Primary Examiner* — Chad H Smith
(74) *Attorney, Agent, or Firm* — Kenealy Vaidya LLP (57) ABSTRACT

An optical connector includes a housing provided on a circuit board, a FOT housed in the housing and having a terminal electrically connected to the circuit board, a shield case covering the housing and fixed to the circuit board, and a shield cover covering at least a slit for cutting and raising formed in the shield case and fixed to the circuit board.

5 Claims, 5 Drawing Sheets

CONNECTOR

CROSS-REFERENCE TO RELATED APPLICATIONS

This application is based on and claims priority under 35 USC 119 from Japanese Patent Application No. 2019-101437 filed on May 30, 2019, the contents of which are incorporated herein by reference.

TECHNICAL FIELD

The present invention relates to a connector.

BACKGROUND ART

For example, in order to improve a noise performance, for an optical connector used in an optical communication field or an I/O connector having a high data transfer rate, a periphery of a connector housing is covered with a shield case made of a conductive metal plate (see, for example, Patent Literatures 1 to 3).

CITATION LIST

Patent Literature

Patent Literature 1: JP-A-2009-69710
Patent Literature 2: JP-A-2014-119691
Patent Literature 3: JP-A-2013-508937

SUMMARY OF INVENTION

On the above connector, a plate spring portion for holding an internal electronic component may be formed on the shield case by cutting and raising. For this reason, a slit for cutting and raising is formed around the plate spring portion on the shield case, and thereby a shielding performance may be deteriorated.

Further, in the connector mounted on a circuit board by the surface mount technology (SMT), in order to avoid a terminal of the electronic component connected to a pad on a surface of the circuit board, a terminal contact prevention gap must be provided between the circuit board and the shield case, and the shielding performance may be further deteriorated.

The present invention has been made in view of the above circumstances, and an object thereof is to provide a connector having a high shielding performance.

The above object of the present invention is achieved by the following configurations.

(1) A connector includes: a housing provided on a circuit board; an electronic component housed in the housing and having a terminal which is configured to be electrically connected to the circuit board: a shield case covering the housing and fixed to the circuit board; and a shield cover covering at least a gap of the shield case and fixed to the circuit board.

According to the connector having the configuration of (1), gaps of the shield case, such as a slit for cutting and raising around the plate spring portion holding the internal electronic component, and the locking slit for locking the shield case to the housing, are covered by the shield cover fixed to the circuit board. Accordingly, the noise emitted from the electronic component and the noise emitted from a peripheral electronic component and the like can be reliably absorbed by the shield case and the shield cover.

Further, the shield cover is fixed to the circuit board. Therefore, when the high shielding performance is required, the shielding performance can be enhanced by covering the gaps of the shield case as necessary without improving the housing or the shield case itself.

(2) In the connector according to (1), the shield cover includes a compliant pin inserted into a through hole which is formed on the circuit board.

According to the connector having the configuration of (2), by inserting the compliant pin into the through hole connected to the ground of the circuit board, the shield cover can be easily fixed to the circuit board, and the shield cover can be easily conducted to the ground. Accordingly, it is possible to save time and labor for electrically connecting and fixing the shield cover to the circuit board by soldering and the like.

(3) In the connector according to (1), the shield cover includes an extension portion extending along a surface of the circuit board and covering a gap between a lower edge of the shield case and the circuit board.

According to the connector having the configuration of (3), the extension portion of the shield cover can suppress leakage or intrusion of noise in the gap between the lower edge of the shield case and the circuit board and the terminal contact prevention gap, and the shielding performance can be further enhanced.

(4) In the connector according to (3), the extension portion includes a contact piece which is in elastic contact with a contact pad for grounding provided on the circuit board.

According to the connector having the configuration of (4), the contact piece of the extension portion is in elastic contact with the contact pad for grounding of the circuit board. Therefore, the shield cover can be easily connected to the ground through the contact pad for grounding of the circuit board.

(5) In the connector according to (1), a photoelectric conversion module as the electronic component is housed in the housing, and a plate spring portion configured to press and urge the photoelectric conversion module and held the photoelectric conversion module in the housing is formed on the shield case, and the shield cover is mounted so as to cover at least a region of the shield case where the plate spring portion is formed.

(6) In the connector according to (5), a lens body including a lens unit is housed in the housing, and the photoelectric conversion module is attached to the lens body.

According to the connector having the configurations of (5) and (6), since the photoelectric conversion module is pressed and urged against the housing by the plate spring portion of the shield case, rattling of the photoelectric conversion module housed in the housing can be suppressed and a vibration resistance can be enhanced. That is, the optical connector including the photoelectric conversion module can be a high-performance optical connector in which the shielding performance is high and the deviation of an optical axis is suppressed.

According to the present invention, the connector that ensures the high shielding performance can be provided.

The present invention has been briefly described above. Further, details of the present invention will be clarified by reading a mode (hereinafter, referred to as "embodiment") for carrying out the invention to be described below with reference to the accompanying drawings.

BRIEF DESCRIPTION OF DRAWINGS

FIGS. 4A and 4B are views illustrating the shield cover shown in FIG. 3, in which

DESCRIPTION OF EMBODIMENTS

Hereinafter, an embodiment according to the present invention will be described with reference to the drawings.

In the present embodiment, an optical connector as a connector used in the optical communication field will be described as an example.

Figure 1:
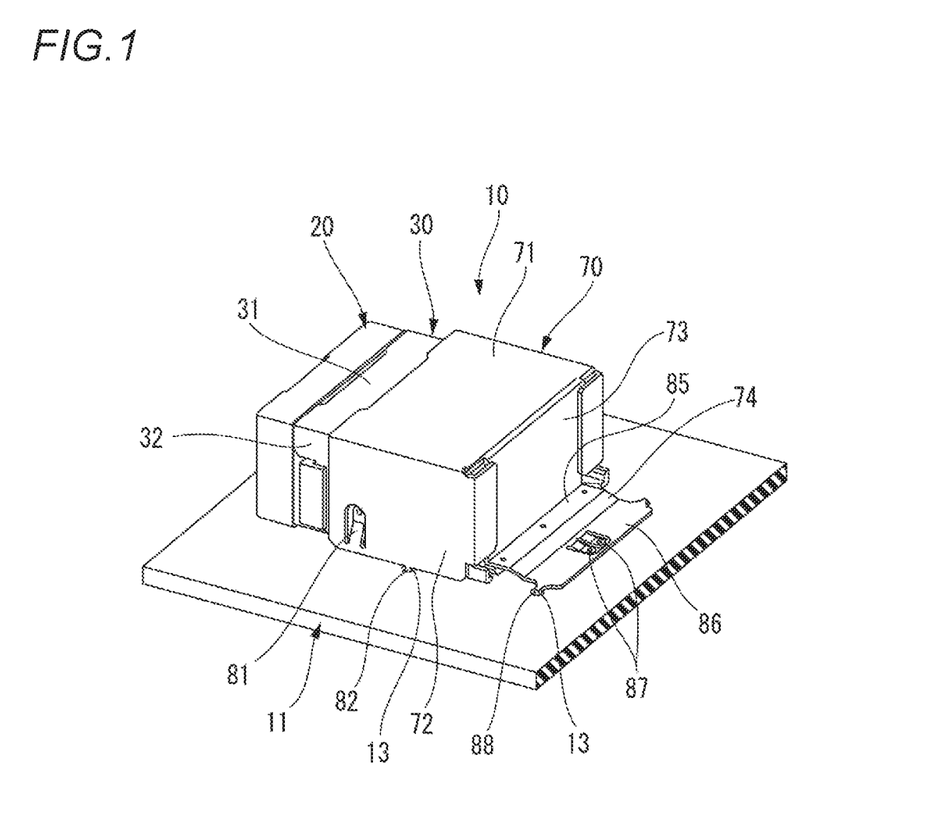
FIG. 1 is a perspective view of an optical connector according to an embodiment of the present invention.
Figure 2:
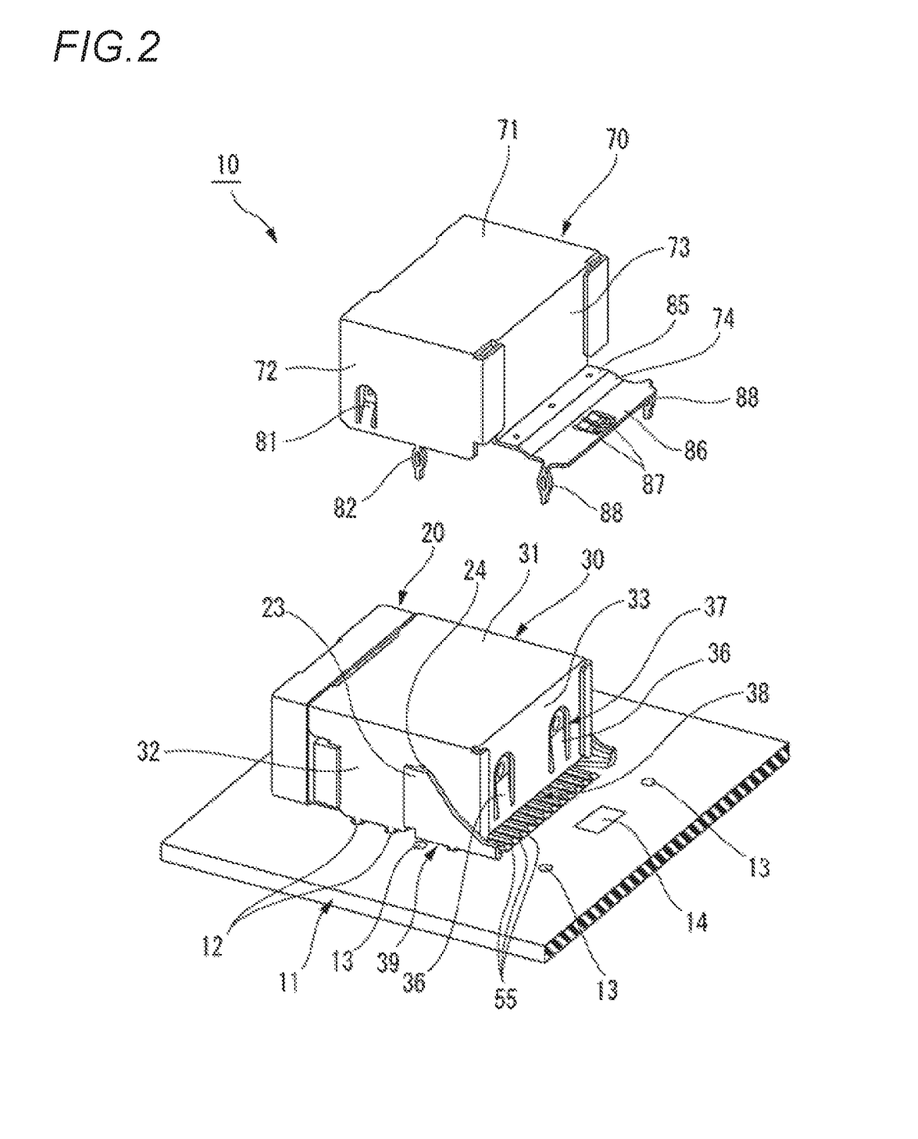
FIG. 2 is a perspective view of the optical connector shown in FIG. 1 with a shield cover removed.

FIG. 1 is a perspective view of an optical connector 10 according to an embodiment of the present invention. FIG. 2 is a perspective view of the optical connector 10 shown in FIG. 1 with a shield cover 70 removed.

As shown in FIGS. 1 and 2, the optical connector (connector) 10 according to the present embodiment is a receptacle optical connector to which a mating side optical connector as a plug connector is joined. The optical connector 10 is mounted on a circuit board 11, and the mating side optical connector (not shown) is fitted and connected thereto. A shield cover 70 is mounted on an outer peripheral side of the optical connector 10.

The circuit board 11 includes through holes 12 for solder connection, through holes 13 for compliant pins, and a contact pad 14 for grounding. The through holes 12, 13 and the contact pad 14 for grounding are all connected to the ground of the circuit board 11.

Figure 3:
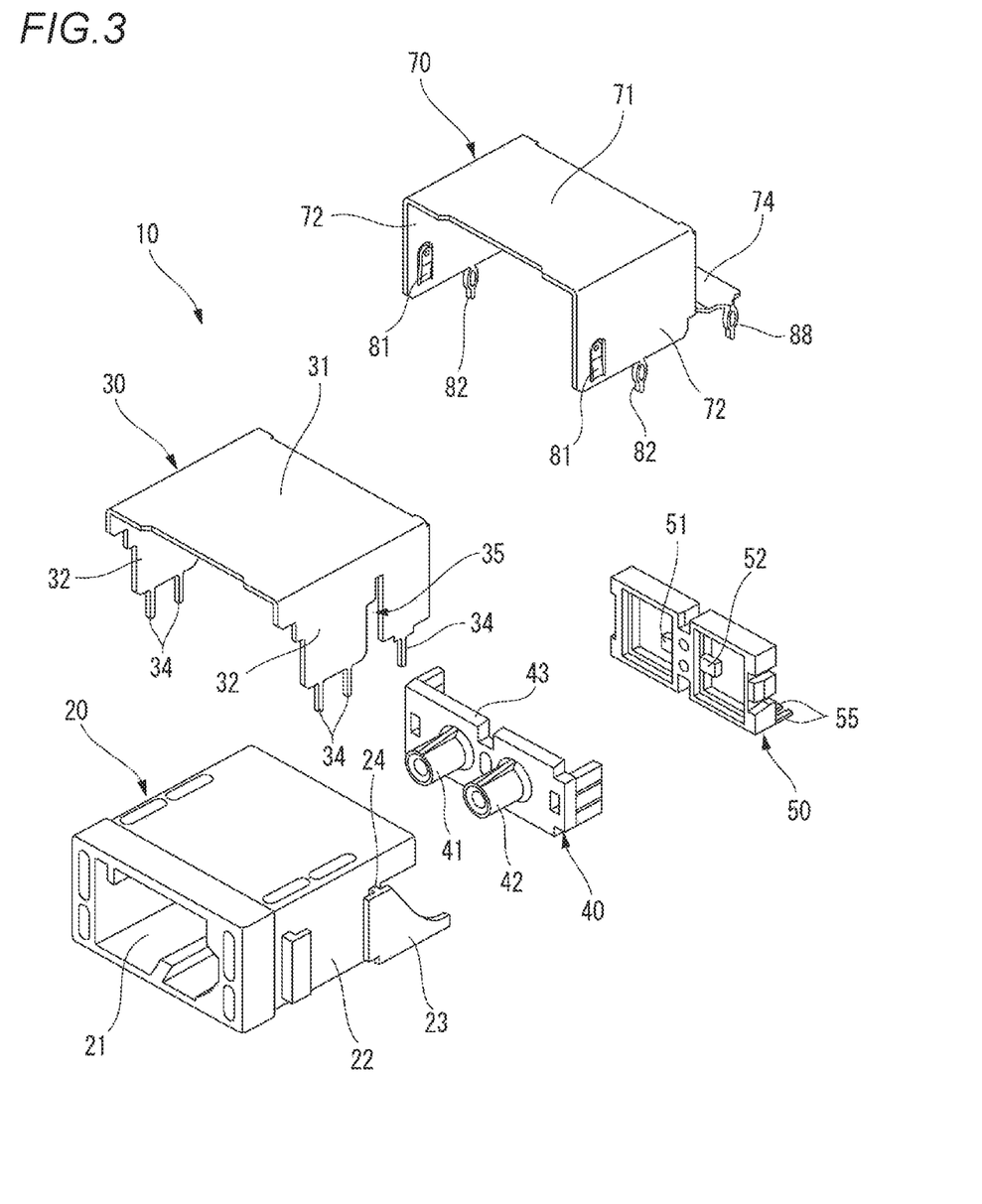
FIG. 3 is an exploded perspective view of the optical connector shown in FIG. 1.

FIG. 3 is an exploded perspective view of the optical connector 10.

As shown in FIG. 3, the optical connector 10 includes a housing 20, a shield case 30, a lens body 40, a photoelectric conversion module (hereinafter, also referred to as fiber optic transceiver (FOT)) 50 as an electronic component, and a shield cover 70.

The housing 20 is a box-shaped member formed of a synthetic resin. The housing 20 is formed with a fitting recessed portion 21 into which the mating optical connector is fitted on a front end side. The housing 20 is provided with a ferrule (not shown) therein, and an end portion of an optical fiber (not shown) of the mating side optical connector fitted in the fitting recessed portion 21 is fitted into the ferrule. The lens body 40 and the FOT 50 are assembled to the housing 20 from a rear end side. The shield case 30 is fitted into and mounted on the housing 20 from an upper portion. Further, the housing 20 includes locking plate portions 23 each lock a side plate portion 32, which will be described later, of the shield case 30 on both side surfaces 22 thereof. The locking plate portion 23 is connected to the side surface 22 of the housing 20 by a connecting portion 24 extending in an upper-lower direction.

The shield case 30 is formed into a box shape and includes a top plate portion 31, the side plate portions 32 formed on both sides of the top plate portion 31, and a rear plate portion 33 formed on a rear side of the top plate portion 31. The shield case 30 is bent and formed into the box shape by pressing a conductive metal plate or the like.

The shield case 30 is mounted on the housing 20 to cover and shield the upper portion, both of the side portions, and a rear portion of the housing 20. A plurality of leg portions 34 are formed on the side plate portion 32. The leg portions 34 are inserted into the through holes 12 for solder connection of the circuit board 11 and soldered. Accordingly, the optical connector 10 is fixed to the circuit board 11, and the shield case 30 is connected to the ground of the circuit board 11.

Further, the shield case 30 includes locking slits 35 each extending upward from a lower edge of the side plate portion 32. The side plate portion 32 of the shield case 30 is fitted into a gap between the side surface 22 of the housing 20 and the locking plate portion 23. At this time, the connecting portion 24 connecting the locking plate portion 23 to the housing 20 is inserted into the locking slit 35 of the side plate portion 32.

Further, the rear plate portion 33 includes a pair of plate spring portions 36 protruding inward (see FIG. 2). These plate spring portions 36 are formed on the rear plate portion 33 of the shield case 30 by cutting and raising after the periphery of portions serving as the plate spring portions 36 is cut to form slits for cutting and raising. The plate spring portion 36 presses and urges a rear surface of the FOT 50 housed in the housing 20. Accordingly, the lens body 40 and the FOT 50 housed in the housing 20 are held in a state in which rattling with respect to the housing 20 is suppressed by an elastic urging force of the plate spring portion 36.

The lens body 40 and the FOT 50 are assembled from the rear end side of the housing 20. The lens body 40 and the FOT 50 are combined with each other so as to be positioned. The lens body 40 and the FOT 50 are assembled to the housing 20 in a state of being combined with each other.

The lens body 40 includes a substrate portion 43 formed in a rectangular shape in a plan view, and a light emitting side lens portion 41 and a light receiving side lens portion 42 are formed on the substrate portion 43. The light emitting side lens portion 41 and the light receiving side lens portion 42 are provided side by side. The lens body 40 is integrally formed of a transparent resin having light guiding properties, so that the light emitting side lens portion 41 and the light receiving side lens portion 42 are integrally provided to protrude forward from a front surface of the substrate portion 43.

The FOT 50 is formed in a rectangular shape in the plan view, and alight emitting side FOT 51 and a light receiving side FOT 52 are provided side by side on a front surface of the FOT 50. The light emitting side FOT 51 includes, for example, a light emitting element such as a light emitting diode (LED), a vertical cavity surface emitting laser (VCSEL), and the light receiving side FOT 52 includes, for example, a light receiving element such as a photo diode (PD). The FOT 50 is integrally formed of a synthetic resin, so that the light emitting side FOT 51 and the light receiving side FOT 52 are integrally provided. A plurality of leads (terminals) 55 are provided at a lower portion of the FOT 50. A tip end portion of the lead 55 is bent toward a rear side of the FOT 50, and the lead 55 is disposed and soldered on a pad (not shown) formed on a surface of the circuit board 11, and electrically connected to a predetermined circuit of the circuit board 11 (see FIG. 2). Thus, the optical connector 10 is mounted on the circuit board 11 by the surface mount technology (SMT).

The lens body 40 and the FOT 50 are fitted from behind the housing 20 and housed in a positioned state. Accordingly, the light emitting side lens portion 41 and the light receiving side lens portion 42 of the lens body 40 are inserted into lens insertion holes (not shown) formed on the housing 20, and are positioned in the ferrule in the housing 20.

In the optical connector 10, an optical signal converted and generated from an electrical signal by the light emitting side FOT 51 of the FOT 50 is incident on the light emitting side lens portion 41 of the lens body 40, and is guided to the optical fiber of the mating side optical connector joined to the fitting recessed portion 21. Further, an optical signal incident on the light receiving side lens portion 42 from another optical fiber of the mating side optical connector is emitted from the light receiving side lens portion 42 of the lens body 40, received by the light receiving side FOT 52 of the FOT 50, and converted into an electrical signal.

Since the optical connector 10 includes the shield case 30, leakage of noise from the FOT 50 as an internal electronic component and intrusion of noise from an external electronic component or the like are suppressed.

On the other hand, as shown in FIG. 2, the plate spring portion 36 is provided on the rear plate portion 33 of the shield case 30, so that a slit for cutting and raising 37 is formed around the plate spring portion 36. In a rear portion of the optical connector 10, a terminal contact prevention gap 38 is formed between the surface of the circuit board 11 and a lower edge of the rear plate portion 33 of the shield case 30 in order to avoid contact with the leads 55 for surface mounting. Further, as shown in FIG. 3, a locking slit 35 for being locked to the housing 20 is formed on each of the two side plate portions 32 of the shield case 30.

Therefore, when a high shielding performance is required, it is necessary to suppress leakage and intrusion of noise in gaps of the shield case 30 such as the locking slits 35, the slits for cutting and raising 37, the terminal contact prevention gap 38. In such a case, in the optical connector 10 according to the present embodiment, the shielding performance can be enhanced by mounting the shield cover 70.

Figure 4A:
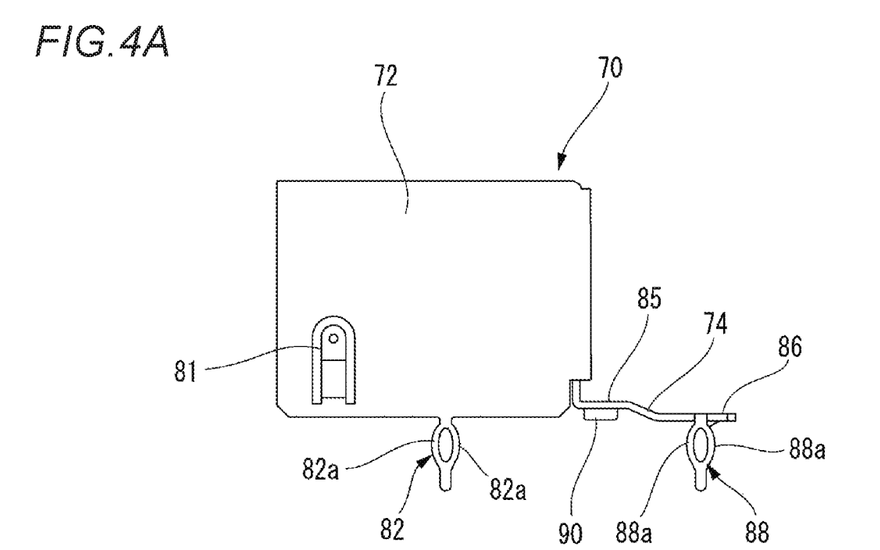
FIG. 4A is a side view of the shield cover.
Figure 4B:
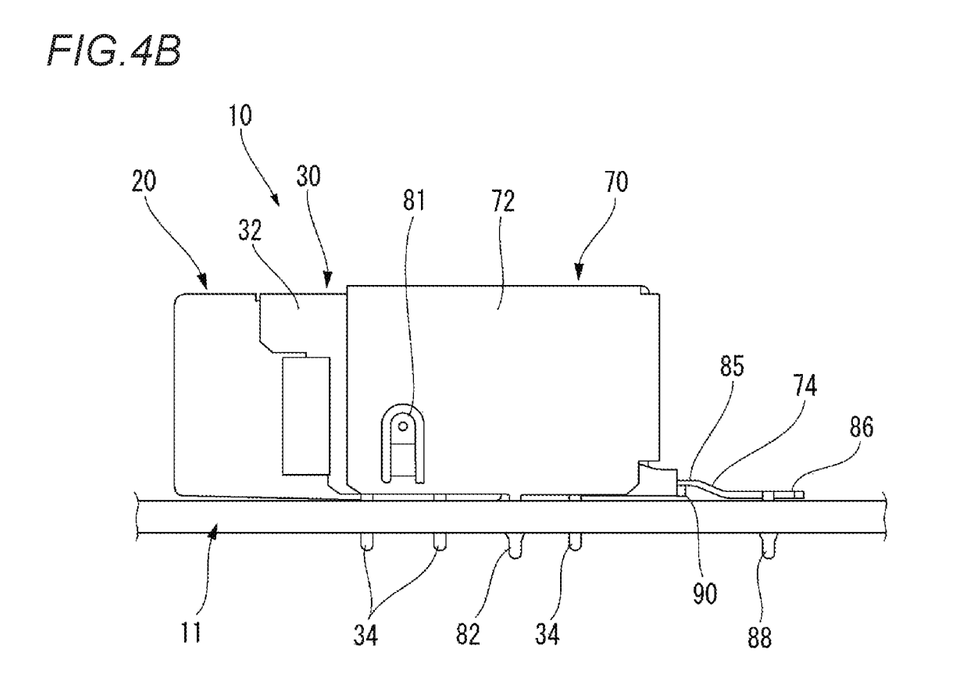
FIG. 4B is a side view of the optical connector.

FIGS. 4A and 4B are views illustrating the shield cover 70 shown in FIG. 3, in which FIG. 4A is a side view of the shield cover 70, and FIG. 4B is a side view of the optical connector 10.

As shown in FIGS. 2 to 4, the shield cover 70 includes a top plate 71, side plates 72 formed on both sides of the top plate 71, and a rear plate 73 formed on a rear side of the top plate 71. The shield cover 70 is formed in a box shape that can be mounted over a rear portion of the shield case 30. Further, the shield cover 70 includes an extension portion 74 extending rearward from a lower edge of the rear plate 73. Similar to the shield case 30, the shield cover 70 is formed into a box shape by pressing a conductive metal plate or the like.

A contact piece 81 protruding inward is formed on each side plate 72 of the shield cover 70. The contact piece 81 comes into contact with the two side plate portions 32 of the shield case 30 by mounting the shield cover 70 over the shield case 30. Accordingly, the shield cover 70 is conducted with the shield case 30. Further, a compliant pin 82 having a pair of outwardly bulging contacts 82a is provided on a lower edge of the side plate 72 of the shield cover 70 so as to protrude downward.

The extension portion 74 includes an upper plate portion 85 and a lower plate portion 86 in order from a rear plate 73 side. The lower plate portion 86 is disposed lower than the upper plate portion 85. On the lower surface side of the upper plate portion 85, for example, a plate-shaped insulating member 90 made of an insulating material such as an insulating synthetic resin is provided. Contact pieces 87 protruding downward are formed in a center portion in a width direction of the lower plate portion 86. Further, the compliant pin 88 having the pair of outwardly bulging contacts 88a is provided on each of both ends of the lower plate portion 86 so as to protrude downward.

Next, a case in which the shield cover 70 is mounted on the housing 20 to which the shield case 30 is mounted will be described.

The shield cover 70 is put on the housing 20 and the shield case 30 which are mounted on the circuit board 11 from above. Then, the compliant pins 82, 88 of the two side plates 72 and the extension portion 74 are inserted into the through holes 13 for compliant pins of the circuit board 11.

Therefore, the shield cover 70 is fixed to the circuit board 11 in a state in which the contacts 82a, 88a of the respective compliant pins 82, 88 are in contact with plated parts on inner surfaces of the through holes 13 and conduct well. Further, the contact pieces 87 provided on the extension portion 74 of the shield cover 70 come into contact with the contact pad 14 for grounding of the circuit board 11 and conduct well. Accordingly, the shield cover 70 is brought into conduction with the ground of the circuit board 11. The contact pieces 81 of the two side plates 72 of the shield cover 70 come into contact with outer surfaces of the two side plate portions 32 of the shield case 30. Accordingly, the shield cover 70 is well conducted with the shield case 30. Since the extension portion 74 is provided with the insulating member 90 on the lower surface of the upper plate portion 85, the lead 55 of the FOT 50 is ensured in the insulating state with respect to the shield cover 70.

In this way, when the shield cover 70 is mounted on the housing 20 to which the shield case 30 is mounted, the slit for cutting and raising 37 around the plate spring portion 36 of the rear plate portion 33 of the shield case 30 is covered with the rear plate 73 of the shield cover 70. Further, the terminal contact prevention gap 38 between the surface of the circuit board 11 and the lower edge of the rear plate portion 33 of the shield case 30 is covered by the extension portion 74 of the shield cover 70. Further, the locking slits 35 formed on the two side plate portions 32 are covered by the two side plates 72 of the shield cover 70, respectively.

Accordingly, in the optical connector 10 of the present embodiment, leakage and intrusion of noise in the slits for cutting and raising 37, the locking slits 35, the terminal contact prevention gap 38, and the like, which are gaps of the shield case 30, are suppressed by the shield cover 70, and the high shielding performance is obtained.

As described above, according to the optical connector 10 according to the present embodiment, the gaps of the shield case 30, such as the slit for cutting and raising 37 around the plate spring portion 36 holding the internal FOT 50, and the locking slit 35 for locking the shield case 30 to the housing 20, are covered by the shield cover 70 fixed to the circuit board 11. Accordingly, the noise emitted from the FOT 50 and the noise emitted from peripheral electronic components and the like can be reliably absorbed by the shield case 30 and the shield cover 70. Further, the shield cover 70 that covers an outer surface of the shield case 30 is fixed to the circuit board 11. Therefore, when the high shielding performance is required, the shielding performance can be enhanced by mounting the shield cover 70 as necessary without improving the housing 20 or the shield case 30 itself.

Further, the shield cover 70 includes the compliant pins 82, 88 inserted into the through holes 13 formed on the circuit board 11. Therefore, by inserting the compliant pins 82, 88 into the through holes 13, the shield cover 70 can be easily fixed to the circuit board 11. Accordingly, it is possible to save time and labor for fixing the shield cover 70 to the circuit board 11 by soldering and the like. Further, by inserting the compliant pins 82, 88 into the through holes 13 connected to the ground of the circuit board 11, the shield cover 70 can be easily conducted to the ground. Accordingly, it is possible to save time and labor for electrically connecting the shield cover 70 to the circuit board 11 by soldering and the like.

Furthermore, the extension portion 74 of the shield cover 70 can suppress leakage or intrusion of noise in the terminal contact prevention gap 38 between the lower edge of the rear plate portion 33 of the shield case 30 and the surface of the circuit board 11, and the shielding performance can be further enhanced.

When the shield covers 70 are fixed to the circuit board 11, the contact pieces 87 of the extension portion 74 are in elastic contact with the contact pad 14 for grounding of the circuit board 11. Therefore, the shield cover 70 can be easily connected to the ground through the contact pad 14 for grounding of the circuit board 11.

Thus, according to the optical connector 10 described above, since the FOT 50 is pressed and urged against the housing 20 by the plate spring portion 36 of the shield case 30, rattling of the FOT 50 housed in the housing 20 can be suppressed and a vibration resistance can be enhanced. That is, the optical connector 10 including the FOT 50 can be a high-performance optical connector in which the shielding performance is high and the deviation of an optical axis is suppressed.

In the above-described embodiment, the optical connector 10 having a structure for suppressing leakage and intrusion of noise by the shield case 30 has been described as an example, but the present invention can be applied to various connectors for suppressing leakage and intrusion of noise by covering the housing on which the electronic component are mounted with the shield case. The present invention is not limited to an optical connector, and can also be applied to an electrical connector for high-speed transmission.

Next, a modification of the present invention will be described.

Figure 5:
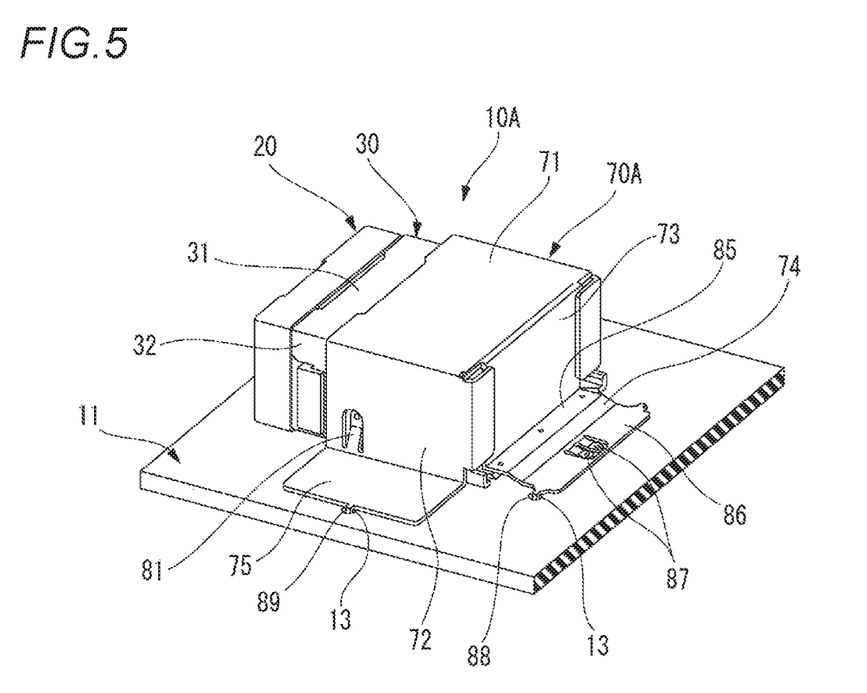
FIG. 5 is a perspective view of an optical connector according to a modification of the present invention.

FIG. 5 is a perspective view of an optical connector 10A according to a modification of the present invention.

As shown in FIG. 5, in the optical connector 10A according to the modification of the present invention, extension portions 75 are formed on both side portions of a shield cover 70A. These extension portions 75 extend laterally from the lower edges of the side plates 72 of the shield cover 70A. Compliant pins 89 each having a pair of outwardly bulging contacts (not shown) are provided on end portions of these extension portions 75 respectively so as to protrude downward. These compliant pins 89 are fixed to the circuit board 11 while being inserted into the through-holes 13 for compliant pins of the circuit board 11 and conducted to the ground.

Also in the case of the optical connector 10A, by mounting the shield cover 70A on the housing 20 on which the shield case 30 is mounted, the slit for cutting and raising 37 around the plate spring portion 36, the terminal contact prevention gap 38 between the surface of the circuit board 11 and the lower edge of the rear plate portion 33 of the shield case 30, and the locking slit 35 can be covered (see FIG. 2). According to the optical connector 10A, the gap 39 (see FIG. 2) between the circuit board 11 and the lower edge of the side plate portion 32 of the shield case 30 can be further covered by the extension portion 75. Accordingly, in the optical connector 10A, leakage and intrusion of noise can be further suppressed by the shield cover 70A, and the high shielding performance can be obtained.

The present invention is not limited to the embodiment described above, and modifications, improvements, and the like can be made as appropriate. In addition, the material, shape, size, number, arrangement position, and the like of each component in the above embodiment are optional and are not limited as long as the present invention can be achieved.

Further, characteristics of the embodiment of the connector according to the present invention described above will be briefly summarized in the following [1] to [6].

[1] A connector (optical connector 10, 10A) includes:
a housing (20) provided on a circuit board (11);
an electronic component (photoelectric conversion module (FOT) 50) housed in the housing (20) and having a terminal (lead 55) configured to be electrically connected to the circuit board (11);
a shield case (30) covering the housing (20) and fixed to the circuit board (11); and a shield cover (70, 70A) covering at least a gap (slit for cutting and raising 37, locking slit 35) of the shield case (30) and fixed to the circuit board (11).

[2] In the connector (optical connector 10, 10A) according to [1], the shield cover (70, 70A) includes a compliant pin (82, 88, 89) inserted into a through hole (13) which is formed on the circuit board (11).

[3] In the connector (optical connector 10, 10A) according to [1] or [2], the shield cover (70, 70A) includes an extension portion (74, 75) extending along a surface of the circuit board (11) and covering a gap (terminal contact prevention gap 38, gap 39) between a lower edge of the shield case (30) and the circuit board (11).

[4] In the connector (optical connector 10, 10A) according to [3], the extension portion (74) includes a contact piece (87) which is brought into elastic contact with a contact pad for grounding (14) provided on the circuit board (11).

[5] In the connector (optical connector 10, 10A) according to [1],
a photoelectric conversion module (FOT 50) as an electronic component is housed in the housing (20),
a plate spring portion (36) configured to press and urge the photoelectric conversion module (FOT 50) and held the photoelectric conversion module in the housing (20) is formed on the shield case (30), and
the shield cover (70, 70A) is mounted so as to cover at least a region of the shield case (30) where the plate spring portion (36) is formed.

[6] In the connector (optical connector 10, 10A) according to [5],
a lens body (40) including a lens unit (light emitting side lens portion 41, light receiving side lens portion 42) is housed in the housing, and
the photoelectric conversion module is attached to the lens body.

What is claimed is:
1. A connector comprising:
a housing provided on a circuit board;
an electronic component housed in the housing and having a terminal which is configured to be electrically connected to the circuit board;
a shield case covering the housing and fixed to the circuit board;
a shield cover covering a first gap and a second gap of the shield case and fixed to the circuit board,
the shield case includes: a rear plate with a lower edge and the first gap is formed between the lower edge of the rear plate and the circuit board, and a side plate with a lower edge and the second gap is formed between the lower edge of the side plate and the circuit board, and the shield cover includes a first extension portion extending along a surface of the circuit board and covering the first gap, a second extension portion extending along the surface of the circuit board and covering the second gap, and the first extension portion is spaced away from the second extension portion and the first extension portion extends in a direction that is orthogonal to the second extension portion.

2. The connector according to claim 1,
wherein the shield cover includes a compliant pin inserted into a through hole which is formed on the circuit board.

3. The connector according to claim 1,
wherein the first extension portion includes a contact piece which is in elastic contact with a contact pad for grounding provided on the circuit board.

4. The connector according to claim 1,
wherein a photoelectric conversion module as the electronic component is housed in the housing,
wherein a plate spring portion configured to press and urge the photoelectric conversion module and hold the photoelectric conversion module in the housing is formed on the shield case, and
wherein the shield cover is mounted so as to cover at least a region of the shield case where the plate spring portion is formed.

5. The connector according to claim 4,
wherein a lens body including a lens unit is housed in the housing, and
wherein the photoelectric conversion module is attached to the lens body.

* * * * *